United States Patent
Yamasaki et al.

(10) Patent No.: US 11,465,556 B2
(45) Date of Patent: Oct. 11, 2022

(54) AUTOMATED DRIVING ENABLED VEHICLE

(71) Applicant: SUBARU CORPORATION, Tokyo (JP)

(72) Inventors: Kentarou Yamasaki, Tokyo (JP); Makoto Kinoshita, Tokyo (JP); Keisuke Takayama, Tokyo (JP); Yuta Muramatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 191 days.

(21) Appl. No.: 16/987,135

(22) Filed: Aug. 6, 2020

(65) Prior Publication Data
US 2021/0094572 A1    Apr. 1, 2021

(30) Foreign Application Priority Data
Sep. 26, 2019    (JP) .............................. JP2019-175681

(51) Int. Cl.
*B60Q 1/50*    (2006.01)
*B60Q 1/34*    (2006.01)
(Continued)

(52) U.S. Cl.
CPC .............. *B60Q 1/507* (2022.05); *B60Q 1/30* (2013.01); *B60Q 1/34* (2013.01); *B60Q 1/50* (2013.01); *B60W 60/0015* (2020.02)

(58) Field of Classification Search
CPC ... B60Q 1/22; B60Q 1/30; B60Q 1/34; B60Q 1/346; B60Q 1/50; B60Q 1/507; B60Q 1/543; B60W 60/0015; B60W 60/005
See application file for complete search history.

(56) References Cited

U.S. PATENT DOCUMENTS

| 8,930,085 B2 | 1/2015 | Takeuchi et al. |
| 10,053,001 B1 | 8/2018 | Nabbe et al. |

(Continued)

FOREIGN PATENT DOCUMENTS

| EP | 3 369 621 A1 | 9/2018 |
| GB | 2571149 A | 8/2019 |

(Continued)

OTHER PUBLICATIONS

U.S. PTO Non-Final Office Action issued in related U.S. Appl. No. 16/983,674, dated Apr. 29, 2021.
(Continued)

*Primary Examiner* — Jason M Han
(74) *Attorney, Agent, or Firm* — McDermott Will & Emery LLP

(57) ABSTRACT

An automated driving enabled vehicle includes an automated driving indicator lamp, one or more lamps, and a lamp controller. The automated driving indicator lamp is configured to be switched on perceptibly from outside the vehicle on the occasion of automated driving of the vehicle. The one or more lamps are provided on the vehicle separately from the automated driving indicator lamp. The lamp controller is configured to start to switch on the automated driving indicator lamp that has been off, before starting to switch on the one or more lamps, on the condition that the vehicle is about to make a departure by the automated driving from a parked or stopped state with the automated driving indicator lamp and the one or more lamps off.

20 Claims, 6 Drawing Sheets

(51) Int. Cl.
*B60Q 1/30* (2006.01)
*B60W 60/00* (2020.01)

(56) References Cited

U.S. PATENT DOCUMENTS

| | | |
|---|---|---|
| 10,195,902 B1 | 2/2019 | Lee et al. |
| 2017/0057542 A1 | 3/2017 | Kim et al. |
| 2017/0225567 A1 | 8/2017 | Tsuda |
| 2017/0229053 A1 | 8/2017 | Ishizuka et al. |
| 2017/0334455 A1 | 11/2017 | Asakura et al. |
| 2018/0017969 A1 | 1/2018 | Nagy et al. |
| 2018/0086260 A1 | 3/2018 | Barillot et al. |
| 2018/0173237 A1 | 6/2018 | Reiley et al. |
| 2018/0304804 A1 | 10/2018 | Tatara et al. |
| 2018/0312106 A1* | 11/2018 | Tatara ............... B60Q 1/26 |
| 2018/0334088 A1 | 11/2018 | Salter et al. |
| 2019/0066548 A1 | 2/2019 | Dellock et al. |
| 2019/0084585 A1 | 3/2019 | Fritz et al. |
| 2019/0111784 A1 | 4/2019 | Tsuda |
| 2019/0168664 A1 | 6/2019 | Tatara et al. |
| 2019/0210517 A1 | 7/2019 | Baker et al. |
| 2019/0248421 A1 | 8/2019 | Jacobsthal et al. |
| 2019/0270406 A1 | 9/2019 | Dubey et al. |
| 2020/0031274 A1 | 1/2020 | Redick et al. |
| 2020/0130573 A1 | 4/2020 | Ito |
| 2020/0156532 A1 | 5/2020 | Lee et al. |
| 2020/0307648 A1 | 10/2020 | Noguchi et al. |
| 2021/0201885 A1 | 7/2021 | Bastyr et al. |

FOREIGN PATENT DOCUMENTS

| | | |
|---|---|---|
| JP | 2018-032433 A | 3/2018 |
| JP | 2019-064471 A | 4/2019 |

OTHER PUBLICATIONS

U.S. PTO Notice of Allowance issued in related U.S. Appl. No. 16/983,674, dated Sep. 2, 2021.
U.S. PTO Non-Final Office Action issued in related U.S. Appl. No. 16/983,614, dated Dec. 29, 2021.
U.S. PTO Non-Final Office Action issued in related U.S. Appl. No. 16/985,953, dated Apr. 22, 2022.
U.S. PTO Non-Final Office Action issued in related U.S. Appl. No. 16/987,174, dated Jun. 9, 2022.
U.S. PTO Non-Final Office Action issued in related U.S. Appl. No. 16/987,077, dated Jun. 22, 2022.

* cited by examiner

LIGHTING INSTRUCTION MANAGEMENT TABLE 70

(A)

| AUTOMATED DRIVING INDICATOR LAMP | SWITCH ON |
|---|---|
| BACK-UP LAMPS | SWITCH OFF |
| TURN SIGNAL LAMPS | SWITCH OFF |

INSTRUCTION TO SWITCH ON BACK-UP LAMPS

LIGHTING INSTRUCTION MANAGEMENT TABLE 70

(B)

| AUTOMATED DRIVING INDICATOR LAMP | SWITCH ON |
|---|---|
| BACK-UP LAMPS | SWITCH ON |
| TURN SIGNAL LAMPS | SWITCH OFF |

PARKED AND STOPPED

SWITCH OFF ALL LAMPS

AUTOMATED DRIVING ENABLED VEHICLE

CROSS-REFERENCE TO RELATED APPLICATIONS

This application claims priority from Japanese Patent Application No. 2019-175681 filed on Sep. 26, 2019, the entire contents of which are hereby incorporated by reference.

BACKGROUND

The technology relates to an automated driving enabled vehicle.

As to vehicles, research and development of automated driving, or automation of vehicle travel, has been in progress.

For example, vehicles in the future are expected to travel to a destination by an automatic control in response to setting of the destination, and to stop and park at the destination.

SUMMARY

An aspect of the technology provides an automated driving enabled vehicle including an automated driving indicator lamp, one or more lamps, and a lamp controller. The automated driving indicator lamp is configured to be switched on perceptibly from outside the vehicle on the occasion of automated driving of the vehicle. The one or more lamps are provided on the vehicle separately from the automated driving indicator lamp. The lamp controller is configured to control a lighting state of the automated driving indicator lamp and lighting states of the one or more lamps. The lamp controller is configured to start to switch on the automated driving indicator lamp that has been off, before starting to switch on the one or more lamps, on the condition that the vehicle is about to make a departure by the automated driving from a parked or stopped state with the automated driving indicator lamp and the one or more lamps off.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1A:
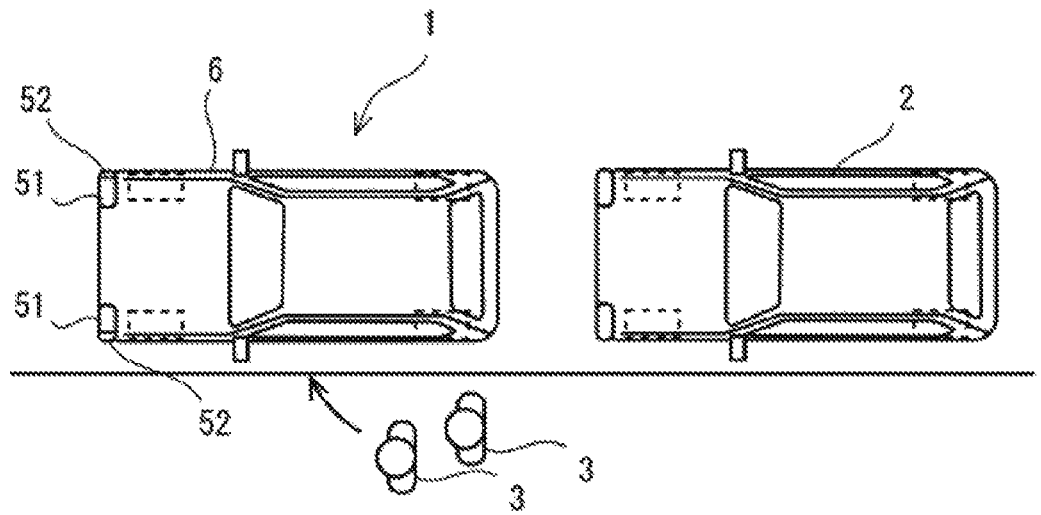
FIGS. 1A to 1C are schematic diagrams of an automated driving enabled automobile according to an embodiment of the technology.

The aims of automated driving enabled vehicles may possibly include making appropriate selection of a travel path, a safety check of a course, and an avoidance control of uncertainties, to travel to the destination without an unanticipated incident.

Executing such a control for safer travel, however, would not guarantee safety to 100% perfection. The possibility is that even such a travel control by automated driving enabled vehicles will provide only a limited level of safety.

For example, automated driving enabled vehicles may include an automated driving indicator lamp. Automated driving enabled vehicles may switch on the automated driving indicator lamp perceptibly from outside them, in a case where they are executing automated driving. Reference is made to, for example, Japanese Unexamined Patent Application Publication (JP-A) Nos. 2018-032433 and 2019-064471.

Such an automated driving enabled vehicle switching on the automated driving indicator lamp during the execution of the automated driving makes it possible for occupants of surrounding vehicles or nearby pedestrians to grasp the situation that the vehicle is executing the automated driving, allowing the occupants or the pedestrians to take an action or a prior countermeasure in response to the situation. The surrounding vehicles may be on a road or a lane on which the automated driving enabled vehicle is traveling.

As described, a travel control of automated driving enabled vehicles themselves provides only a limited level of safety in their travel environment. Automated driving enabled vehicles owe their enhanced safety to cooperation with surrounding vehicles and pedestrians.

On the other hand, keeping automated driving indicator lamps of automated driving enabled vehicles on during the execution of the automated driving contributes to a concern about power consumption of the automated driving indicator lamps. Such power consumption of the automated driving indicator lamp may be possibly counteracted by switching off the automated driving indicator lamp in a case where, for example, the vehicle executing the automated driving is parked or stopped along, for example, a roadside.

Meanwhile, switching off the automated driving indicator lamp while the vehicle is parked or stopped may cause situations, for example, as follows.

For example, an occupant may get in the vehicle parked or stopped during the execution of the automated driving, causing the vehicle to make an abrupt departure. In this case, the automated driving indicator lamp is switched on at the same time as the abrupt departure of the vehicle. Nearby pedestrians and occupants of surrounding vehicles would be surprised at the vehicle making the abrupt departure.

In another example, on the occasion of a departure, not only the automated driving indicator lamp but also other lamps may be switched on at the same time. This may cause the possibility that an illumination color of the automated driving indicator lamp becomes less perceptible. Even if the automated driving indicator lamp is switched on upon the departure of the vehicle, those around the vehicle, e.g., pedestrians, may fail to properly recognize that the vehicle has started the departure by the automated driving, because the illumination color of the automated driving indicator lamp is less perceptible.

As described, automated driving enabled vehicles have had room for improvements.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

Figure 1B:
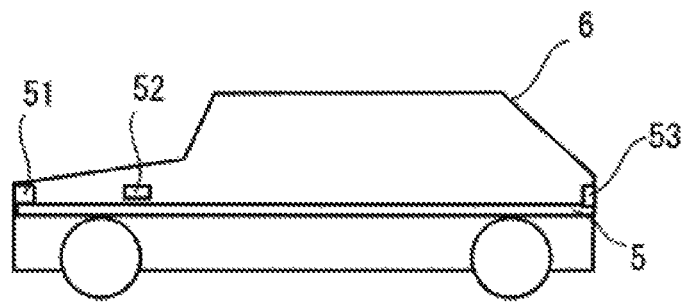
Figure 1C:
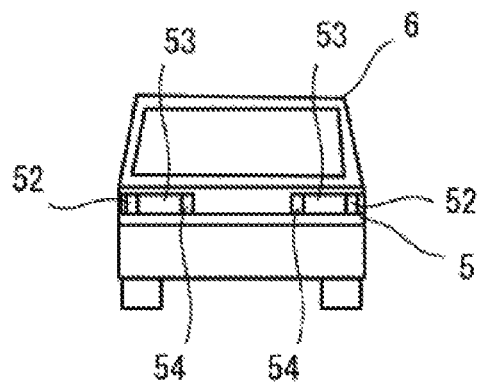

FIGS. 1A to 1C are schematic diagrams of an automated driving enabled automobile 1 according to an embodiment of the technology. In the following, the automated driving enabled automobile 1 is also simply referred to as an "automobile 1".

FIG. 1A is a top view of the automobile 1. In FIG. 1A, the automobile 1 is assumed to be stopped along a roadside of a driveway, waiting for occupants 3 to get in. Behind the automobile 1, a surrounding automobile 2 is stopped. The occupants 3 are assumed to get in the automobile 1 from a walkway of the roadside. FIG. 1B is a side view of the automobile 1. FIG. 1C is a rear view of the automobile 1.

Referring to FIGS. 1A to 1C, the automobile 1 is configured to travel while switching between automated driving and manual driving. The automobile 1 includes an automated driving indicator lamp 5. The automated driving indicator lamp 5 is configured to be switched on, on the occasion of the automated driving.

The automated driving indicator lamp 5 may be a lamp that is switched on, to indicate that the automated driving is in execution. The automated driving indicator lamp 5 may circumscribe a vehicle body 6 of the automobile 1, for example, on all sides, i.e., front, rear, right and left sides, of the vehicle body 6. This makes it possible for the occupant 3 around the automobile 1 and the occupant 3 of the surrounding automobile 2 to visually recognize, from outside the automobile 1, illumination of the automated driving indicator lamp 5 on the occasion of the execution of the automated driving. Switching on the automated driving indicator lamp 5 on the occasion of the automated driving makes it possible to receive cooperation with the occupant 3 near the automobile 1 and the occupant 3 of the surrounding automobile 2. Hence, it is possible to expect a higher level of safety than provided solely by a travel control of the automobile 1 itself.

The automated driving indicator lamp 5 may have other configurations than described above. For example, the automated driving indicator lamp 5 may be provided separately on four corners, i.e., front right, front left, rear right, and rear left corners, of the vehicle body 6. In one alternative, the automated driving indicator lamp 5 may be provided along an outer periphery of a roof panel over a vehicle cabin. In another alternative, the automated driving indicator lamp 5 may protrude from the roof panel.

The automated driving indicator lamp 5 is configured to be switched on, in a case where the automobile 1 is traveling by the automated driving. On the other hand, keeping the automated driving indicator lamp 5 on during the execution of the automated driving may cause an increase in power consumption of the automated driving enabled automobile 1. In particular, for the electrically powered automobile 1, a steady increase in power consumption during the execution of the automated driving may shorten its cruising range and directly affect its travel performance. This may be possibly counteracted by switching off the automated driving indicator lamp 5 in a case where, for example, the automobile 1 executing the automated driving is parked or stopped.

Meanwhile, switching off the automated driving indicator lamp 5 while the automobile 1 is parked or stopped may cause situations, for example, as follows. For example, an occupant may get in the automobile 1 parked or stopped during the execution of the automated driving, causing the automobile 1 to make an abrupt departure. In this case, the automated driving indicator lamp 5 is switched on at the same time as the abrupt departure of the automobile 1. Nearby pedestrians and occupants of the surrounding automobile 2 would be surprised at the automobile 1 making the abrupt departure.

In another example, on the occasion of a departure, not only the automated driving indicator lamp 5 but also other lamps than the automated driving indicator lamp 5, e.g., turn signal lamps 52, may be switched on at the same time. This may cause mixture of their illumination colors, resulting in the possibility that the illumination color of the automated driving indicator lamp 5 becomes less perceptible. Even if the automated driving indicator lamp 5 is switched on upon the departure of the automobile 1, those around the automobile 1, e.g., pedestrians, may fail to properly recognize that the automobile 1 has started the departure by the automated driving, because the illumination color of the automated driving indicator lamp 5 is less perceptible.

As described, the automated driving enabled automobile 1 has had room for improvements.

Figure 2:
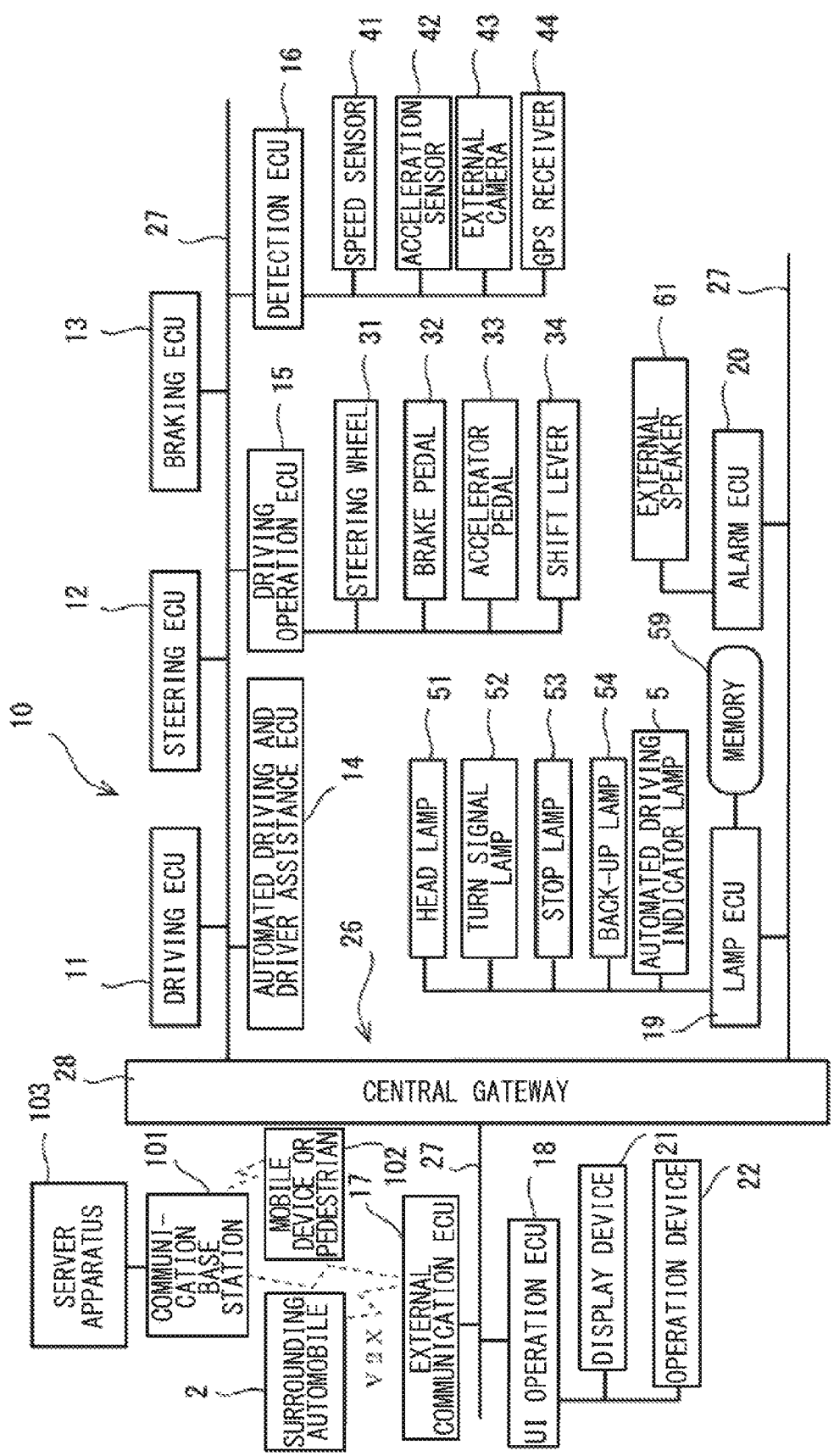
FIG. 2 is a block diagram of a control system of the automobile illustrated in FIGS. 1A to 1C.

FIG. 2 illustrates a control system 10 of the automobile 1 in FIGS. 1A to 1C. The control system 10 of the automobile 1 may include a plurality of controllers that are installed in their respective control ECUs (electronic control units). In FIG. 2, each of the plurality of the controllers is typically represented by a corresponding one of the control ECUs. Each of the plurality of the controllers may include not only the control ECU but also a storage member, input and output ports, a timer, and an internal bus to which the control ECU, the storage member, the input and output ports, and the timer are coupled. The storage member may hold, for example, a control program and data. The input and output ports may be coupled to an object to be controlled, and/or to a device that detects a state of the object to be controlled. The timer may measure time and timing.

As illustrated in FIG. 2, in one specific but non-limiting example, the control ECUs may include a driving ECU 11, a steering ECU 12, a braking ECU 13, an automated driving and driver assistance ECU 14, a driving operation ECU 15, a detection ECU 16, an external communication ECU 17, a UI operation ECU 18, a lamp ECU 19, and an alarm ECU 20. The control system 10 of the automobile 1 may further include other undepicted control ECUs.

The plurality of the control ECUs may be coupled to a vehicle network 26 adopted by the automobile 1 such as a CAN (controller area network) and a LIN (local interconnect network). The vehicle network 26 may include a plurality of bus cables 27 and a CGW (central gateway) 28. The plurality of the bus cables 27 is able to be coupled to the plurality of the control ECUs. The central gateway 28 may serve as a relay device to which the plurality of the bus cables 27 is coupled. To the plurality of the control ECUs, their respective IDs (identifications) may be assigned. The IDs may differ from one another and serve as identification information. Each of the control ECU may output, basically on a periodical basis, notification data to one or more of the other control ECUs. To the notification data, the ID of the sender control ECU and the ID of the receiver control ECU may be attached. The other control ECUs than the sender control ECU may monitor the respective ones of the bus cables 27 to which they are coupled. For example, in a case where any one of the other control ECUs finds the ID of the receiver control ECU to match its own ID, the relevant control ECU may acquire the notification data and execute processing based on the notification data. The central gateway 28 may monitor each of the plurality of the bus cables 27 coupled to the central gateway 28. In a case where the central gateway 28 detects one or more of the other control ECUs coupled to any one of the bus cables 27 different from the bus cable 27 to which the sender control ECU is coupled, the central gateway 28 may supply the notification data to the relevant one of the bus cables 27. With such relay processing by the central gateway 28, it is possible for each of the control ECUs to send the notification data to one or more of the other control ECUs coupled to respective ones of the bus cables 27 different from the bus cable 27 to which the sender control ECU is coupled. It is also possible for each of the control ECUs to receive the notification data from any one of the control ECUs coupled to the corresponding one of the bus cables 27 different from the bus cable 27 to which the receiver control ECU is coupled.

The external communication ECU 17 may perform wireless communication with, for example, a communication base station 101 and a communication device of the surrounding automobile 2. The communication base station 101 and the surrounding automobile 2 are present outside the automobile 1. The communication base station 101 may be, for example, a base station of an ADAS (advanced driver assistance system) communication network, or alternatively, the communication base station 101 may be, for example, a base station of a carrier communication network. The base station of the carrier communication network may communicate not only with the communication device of the surrounding automobile 2 but also with a mobile device 102 held by the occupant 3. The external communication ECU 17 may be divided into a plurality of subunits for respective categories of partners with whom the external communication ECU 17 communicates directly, and the subunits may be provided in the automobile 1. The communication base station 101, the communication device of the surrounding automobile 2, and the mobile device 102, together with a server apparatus 103, may constitute a traffic system 100. The external communication ECU 17 may transmit and receive communication data to and from the server apparatus 103, the surrounding automobile 2, or the mobile device 102 by directly performing wireless communication with the communication base station 101 or the communication device of the surrounding automobile 2.

To the UI operation ECU 18, a display device 21 and an operation device 22 may be coupled as, for example, a user interface device with the occupant 3 of the automobile 1. The display device 21 may include, for example, a liquid crystal device or a video projection device, or both. The operation device 22 may be, for example, a touchscreen, a keyboard, or a contactless operation sensing device, or any combination thereof. The display device 21 and the operation device 22 may be mounted on, for example, an inner surface of the vehicle cabin in which the occupant 3 rides. The UI operation ECU 18 may acquire the notification data from the vehicle network 26, and display the notification data on the display device 21. The UI operation ECU 18 may output, to the vehicle network 26, an operation input made on the operation device 22. Moreover, the UI operation ECU 18 may perform processing based on the operation input and incorporate a result of the processing in the notification data. The UI operation ECU 18 may provide, for example, display of a navigation screen on the display screen 21. The navigation screen may allow for setting of, for example, a destination. The UI operation ECU 18 may search a path to the destination selected by the operation input. The UI operation ECU 18 may incorporate data regarding the path in the notification data. The data regarding the path may include attribute information regarding, for example, lanes of roads to be used to move from a current position to the destination.

To the driving operation ECU 15, coupled may be operation members that allow the occupant 3 to control the travel of the automobile 1. Specific but non-limiting examples of the operation members may include a steering wheel 31, a brake pedal 32, an accelerator pedal 33, and a shift lever 34. If any operation is made on the operation members, the driving operation ECU 15 may output, to the vehicle network 26, the notification data including, for example, presence or absence of the operation and an amount of the operation. Moreover, the driving operation ECU 15 may execute processing regarding the operation on the operation members, and incorporate a result of the processing in the notification data. For example, if any operation is made on the accelerator pedal 33, with presence of surrounding moving objects and/or fixed objects in a traveling direction of the automobile 1, the driving operation ECU 15 may make a determination that the operation on the accelerator pedal 33 is an abnormal operation. The driving operation ECU 15 may incorporate the result of the determination in the notification data.

To the detection ECU 16, coupled may be detection members that detect a travel state of the automobile 1. Specific but non-limiting examples of the detection members may include a speed sensor 41, an acceleration sensor 42, an external camera 43, and a GPS receiver 44. The speed sensor 41 may detect a speed of the automobile 1. The acceleration sensor 42 may detect an acceleration rate of the automobile 1. The external camera 43 may capture an image of external surroundings of the automobile 1, and include, for example, a stereo camera. The GPS receiver 44 may serve as a GNSS (global navigation satellite system) receiver that detects a position of the automobile 1. The detection ECU 16 may acquire detection information from the detection members. The detection ECU 16 may output the notification data including the detection information to the vehicle network 26. Furthermore, the detection ECU 16 may execute processing based on the detection information and incorporate a result of the processing in the notification data. For example, in a case where the acceleration sensor 42 detects the acceleration rate being higher than a threshold of detection of a collision, the detection ECU 16 may make a determination that a collision has been detected. The detection ECU 16 may incorporate the result of the determination in the notification data. The detection ECU 16 may extract a moving body such as the occupant 3 or the surrounding automobile 2 that are present around the automobile 1, on the basis of the image of the external camera 43. The detection ECU 16 may determine a kind and attributes of the moving body, and make estimation of a relative direction, a relative distance, and a direction of movement of the moving body in accordance with a position, a size, and a change of the moving body in the image. The detection ECU 16 may incorporate information regarding the moving body including a result of the estimation in the notification data and output the notification data to the vehicle network 26.

The automated driving and driver assistance ECU 14 may acquire the notification data from the vehicle network 26 and switch a travel control state of the automobile 1 between the automated driving and the manual driving.

Moreover, the automated driving and driver assistance ECU 14 may acquire the notification data from the vehicle network 26, execute a control for the automated driving or driver assistance of the automobile 1, and generate travel control data to output the travel control data to the driving ECU 11, the steering ECU 12, and the braking ECU 13. The driving ECU 11, the steering ECU 12, and the braking ECU 13 may control the travel of the automobile 1 on the basis of the travel control data to be supplied.

In one specific but non-limiting example, in performing the automated driving of the automobile 1, the automated driving and driver assistance ECU 14 may acquire the notification data from the vehicle network 26 and search or acquire the path to the destination. The automated driving and driver assistance ECU 14 may acquire the notification data from the vehicle network 26, determine presence or absence of an abnormality or uncertainties in the automobile 1. In a case without any abnormality or uncertainties in the automobile 1, the automated driving and driver assistance ECU 14 may generate the travel control data regarding a course to be traveled along the path, and output the generated travel control data as the notification data. The automated driving and driver assistance ECU 14 may control the travel of the automobile 1 on the basis of positional information of the automobile 1 from, for example, the GPS receiver 44, to allow the automobile 1 to travel along the path of its movement until an arrival at the destination, i.e., until the automobile 1 stops, for example, in a parking lot at the destination. In a case with an abnormality or uncertainties with respect to the automobile 1, the automated driving and driver assistance ECU 14 may generate the travel control data to avoid the abnormality or the uncertainties, and output the generated travel control data as the notification data.

In assisting with driving of the automobile 1, the automated driving and driver assistance ECU 14 may acquire the notification data regarding the operation input from the UI operation ECU 18 through the vehicle network 26. The automated driving and driver assistance ECU 14 may generate the travel control data in which an operation based on the operation input is adjusted, and output the travel control data as the notification data. The automated driving and driver assistance ECU 14 may control the travel of the automobile 1 in accordance with a driving operation by the occupant 3. In a case with an abnormality or uncertainties with respect to the automobile 1, the automated driving and driver assistance ECU 14 may generate the travel control data to avoid the abnormality or the uncertainties, and output the generated travel control data as the notification data.

To the lamp ECU 19, coupled may be head lamps 51, the turn signal lamps 52, stop lamps 53, back-up lamps 54, and the automated driving indicator lamp 5. The head lamps 51 may be provided in a front part of the vehicle body 6 of the automobile 1. The turn signal lamps 52 may be provided on front right, front rear, rear right, and rear left corners of the vehicle body 6. The stop lamps 53 may be provided in a rear part of the vehicle body 6. The back-up lamps 54 may be provided in the rear part of the vehicle body 6.

In one embodiment of the technology, the turn signal lamps 52 may each serve as a "direction indicator". In one embodiment of the technology, the back-up lamps 54 may each serve as a "reverse lamp". In one embodiment of the technology, the head lamps 51, the turn signal lamps 52, the stop lamps 53, and the back-up lamps 54 may serve as "one or more lamps" provided on the automobile 1 separately from the automated driving indicator lamp 5.

It is to be noted that in this embodiment, description is given on a case where the head lamps 51, the turn signal lamps 52, the stop lamps 53, and the back-up lamps 54 may serve as the "one or more lamps". However, the head lamps 51, the turn signal lamps 52, the stop lamps 53, or the back-up lamps 54, or any combination thereof may serve as the "one or more lamps".

In the following, for purposes of convenience, the one or more lamps, e.g., the head lamps 51, the turn signal lamps 52, the stop lamps 53, and the back-up lamps 54, are also referred to as "other lamps than the automated driving indicator lamp 5", or simply, "other lamps".

Moreover, as illustrated in the figure, a memory 59 may be coupled to the lamp ECU 19. The memory 59 coupled to the lamp ECU 19 may hold programs, setting values, and a lighting instruction management table 70 described later. The programs, the setting values, and the lighting instruction management table 70 are provided for the use for a control by the lamp ECU 19. The lighting instruction management table 70 may include records of latest lighting control instructions given to the lamp ECU 19. The lighting control instructions are provided for a lighting control of the lamps described above, that is, the automated driving indicator lamp 5 and the other lamps. The memory 59 may hold a current state of the lighting control instruction with respect to the automated driving indicator lamp 5, and a current state of the lighting control instruction with respect to each of the other lamps, e.g., the turn signal lamps 52 and the back-up lamps 54 in this example.

The lamp ECU 19 may read the programs held by the memory 59 and execute the programs. Thus, in one embodiment of the technology, the lamp ECU 19 may serve as a "lamp controller".

In one specific but non-limiting example, the lamp ECU 19 may acquire, from the vehicle network 26, the notification data for a lamp control. In accordance with the notification data acquired, the lamp ECU 19 may control lighting states of the lamps provided on the automobile 1, e.g., the head lamps 51, the turn signal lamps 52, the stop lamps 53, the back-up lamps 54, and the automated driving indicator lamp 5. Thus, the lamp ECU 19 may serve as the "lamp controller" in one embodiment of the technology. For example, in a case where the automated driving and driver assistance ECU 14 is controlling the travel of the automobile 1 by the automated driving, the lamp ECU 19 may switch on the automated driving indicator lamp 5 perceptibly from outside the automobile 1 during the execution of the automated driving, on the basis of the notification data from the automated driving and driver assistance ECU 14. This makes it possible for the moving body outside the automobile 1, e.g., the occupant 3 and the surrounding automobile 2, to visually recognize, with the clue of the illumination of the automated driving indicator lamp 5, that the automobile 1 is executing the automated driving. Hence, it is possible for the moving body outside the automobile 1, e.g., the occupant 3 and the surrounding automobile 2, to cope with the travel of the automobile 1 executing the automated driving. The lamp ECU 19 may switch off the automated driving indicator lamp 5, in a case where, for example, travel environment of the automobile 1 renders it unnecessary to switch on the automated driving indicator lamp 5 regardless of the execution of the automated driving.

To the alarm ECU 20, an external speaker 61 may be coupled. The alarm ECU 20 may acquire the notification data regarding an alarm output from the vehicle network 26 and output an alarm sound from the external speaker 61 in response to the notification data thus acquired.

Figure 3:
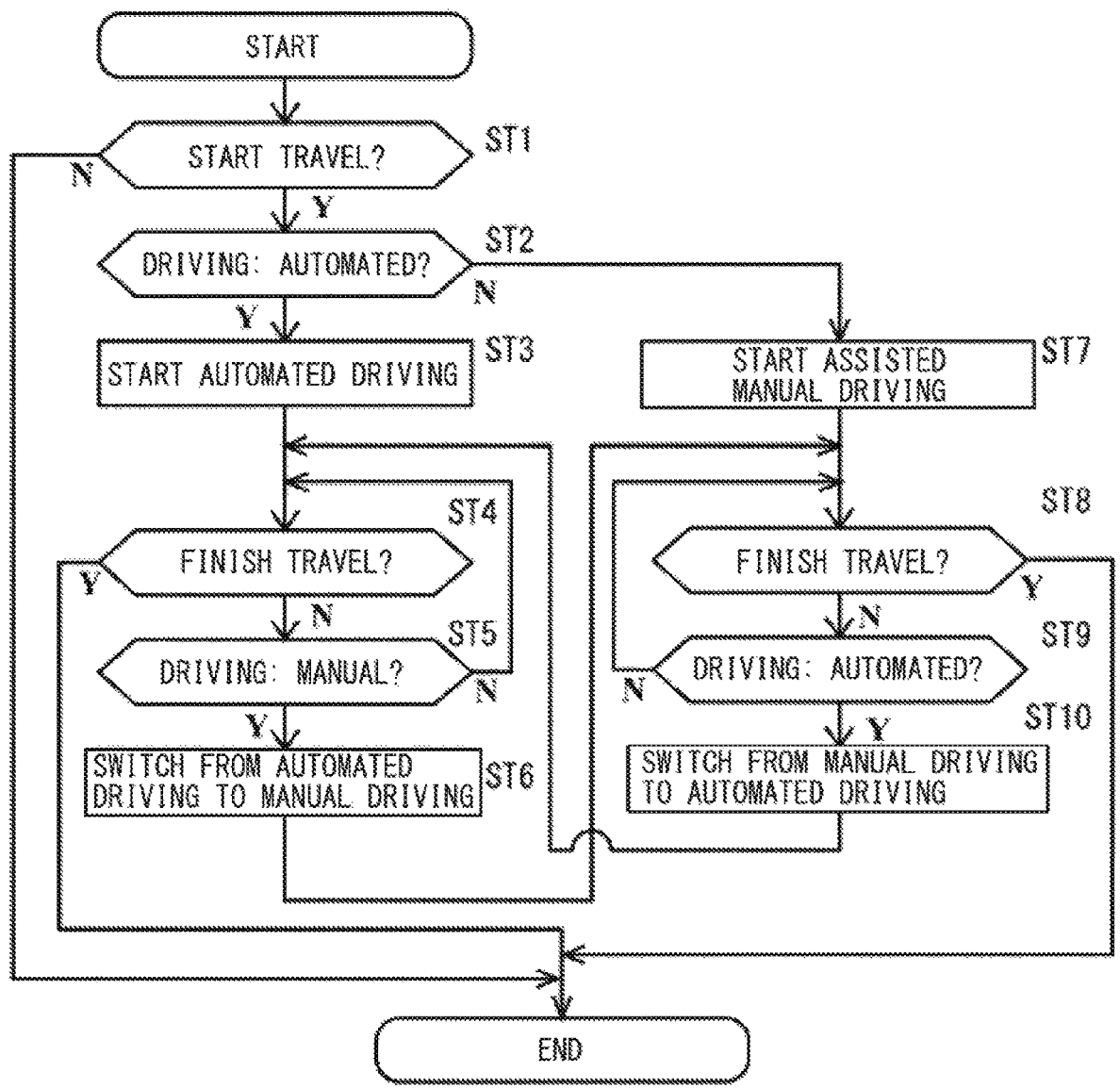
FIG. 3 is a flowchart of a switching control between automated driving and assisted manual driving.

FIG. 3 is a flowchart of a switching control between the automated driving and assisted manual driving. The automated driving and driver assistance ECU 14 may repeatedly execute processing of FIG. 3 in a case where, for example, the occupant rides in the automobile 1.

In step ST1, the automated driving and driver assistance ECU 14 may determine whether or not to start the travel of the automobile 1. In a case where the travel of the automobile 1 is not going to be started (N in step ST1), the automated driving and driver assistance ECU 14 may terminate the processing of FIG. 3. In a case where the travel of the automobile 1 is going to be started (Y in step ST1), the automated driving and driver assistance ECU 14 may cause the processing to proceed to step ST2.

In step ST2, the automated driving and driver assistance ECU 14 may determine whether or not the travel of the automobile 1 is controlled by the automated driving. The automated driving and driver assistance ECU 14 may determine whether or not the travel of the automobile 1 is controlled by the automated driving on the basis of, for example, a setting value of a driving mode acquired from the UI operation ECU 18. In a case where the travel of the automobile 1 is controlled by the automated driving (Y in step ST2), the automated driving and driver assistance ECU 14 may cause the processing to proceed to step ST3. In a case where the travel of the automobile 1 is not controlled by the automated driving but is otherwise controlled, e.g., by the assisted manual driving (N in step ST2), the automated driving and driver assistance ECU 14 may cause the processing to proceed to step ST7.

In step ST3, the automated driving and driver assistance ECU 14 may start the travel by the automated driving. The automated driving and driver assistance ECU 14 may control the travel of the automobile 1 by the automated driving.

In step ST4, the automated driving and driver assistance ECU 14 may determine whether or not to finish the travel of the automobile 1. The automated driving and driver assistance ECU 14 may determine that the travel of the automobile 1 is going to be finished, in a case where the positional information of the automobile 1 indicates that the automobile 1 is stopped, for example, in a parking lot at the destination of the automated driving, with the acceleration rate being zero (0). The positional information of the automobile 1 may be acquired from the external communication ECU 17 or the GPS receiver 44. In a case where the automated driving and driver assistance ECU 14 determines that the travel of the automobile 1 is going to be finished (Y in step ST4), the automated driving and driver assistance ECU 14 may terminate the processing of FIG. 3. Thus, the travel by the automated driving is finished. In a case where the automated driving and driver assistance ECU 14 does not determine that the travel of the automobile 1 is going to be finished (N in step ST4), the automated driving and driver assistance ECU 14 may cause the processing to proceed to step ST5.

In step ST5, the automated driving and driver assistance ECU 14 may determine whether or not to switch the travel of the automobile 1 from the automated driving to otherwise than the automated driving, e.g., the manual driving. The automated driving and driver assistance ECU 14 may determine that the travel of the automobile 1 is going to be switched from the automated driving, on the basis of, for example, the setting value of the driving mode acquired from the UI operation ECU 18. In a case where the travel of the automobile 1 is not going to be switched from the automated driving to otherwise than the automated driving (N in step ST5), the automated driving and driver assistance ECU 14 may cause the processing to return to step ST4. The automated driving and driver assistance ECU 14 may repeat the determinations of steps ST4 and ST5 while the automated driving is in execution. In a case where the travel of the automobile 1 is going to be switched from the automated driving to otherwise than the automated driving (Y in step ST5), the automated driving and driver assistance ECU 14 may cause the processing to proceed to step ST6.

In step ST6, the automated driving and driver assistance ECU 14 may switch the travel of the automobile 1 from the automated driving to otherwise than the automated driving, e.g., the assisted manual driving. Thus, the travel by the automated driving is finished, and the travel by the manual driving is started. Thereafter, the automated driving and driver assistance ECU 14 may cause the processing to proceed to step ST8.

In step ST7, the automated driving and driver assistance ECU 14 may start the assisted manual driving or otherwise than the automated driving.

In step ST8, the automated driving and driver assistance ECU 14 may determine whether or not to finish the travel of the automobile 1. For example, the automated driving and driver assistance ECU 14 may determine that the travel of the automobile 1 is going to be finished, in a case where the automobile 1 is stopped, with the acceleration rate being zero (0), and an operation is made on an ignition switch of the automobile 1. In a case with a determination that the travel of the automobile 1 is going to be finished (Y in step ST8), the automated driving and driver assistance ECU 14 may terminate the processing of FIG. 3. Thus, the travel by the assisted manual driving is finished. In a case without the determination that the travel of the automobile 1 is going to be finished (N in step ST8), the automated driving and driver assistance ECU 14 may cause the processing to proceed to step ST9.

In step ST9, the automated driving and driver assistance ECU 14 may determine whether or not to switch the travel of the automobile 1 from the assisted manual driving to the automated driving. The automated driving and driver assistance ECU 14 may determine that the travel of the automobile 1 is going to be switched from the assisted manual driving, on the basis of, for example, the setting value of the driving mode acquired from the UI operation ECU 18. In a case where the travel of the automobile 1 is not going to be switched from the assisted manual driving to the automated driving (N in step ST9), the automated driving and driver assistance ECU 14 may cause the processing to return to step ST8. The automated driving and driver assistance ECU 14 may repeat the determinations of steps ST8 and ST9 while the assisted manual driving is in execution. In a case where the travel of the automobile 1 is going to be switched from the assisted manual driving to the automated driving (Y in step ST9), the automated driving and driver assistance ECU 14 may cause the processing to proceed step ST10.

In step ST10, the automated driving and driver assistance ECU 14 may switch the travel of the automobile 1 from the assisted manual driving to the automated driving. Thus, the travel by, for example, the assisted manual driving or otherwise than the automated driving is finished, and the travel by the automated driving is started. Thereafter, the automated driving and driver assistance ECU 14 may cause the processing to proceed to step ST4.

As described, the automated driving and driver assistance ECU 14 may repeatedly execute the processing of FIG. 3, in a case where, for example, the automobile 1 is traveling, with the occupant 3 riding therein. For example, the automated driving and driver assistance ECU 14 may acquire, through the vehicle network 26, the notification data inclusive of setting information of the driving mode from the UI operation ECU 18, and switch the travel of the automobile 1 between the automated driving and the assisted manual driving. Moreover, the automated driving and driver assistance ECU 14 may acquire the notification data inclusive of an instruction to compulsively switch to the manual driving, and switch the travel of the automobile 1 between the automated driving and the assisted manual driving. Such an instruction may be based on, for example, detection of an abnormality from the detection ECU 16. Furthermore, the automated driving and driver assistance ECU 14 itself may generate the notification data inclusive of the instruction based on the detection of an abnormality, to compulsively switch to the manual driving, and switch the travel of the automobile 1 between the automated driving and the assisted manual driving.

Figure 4:
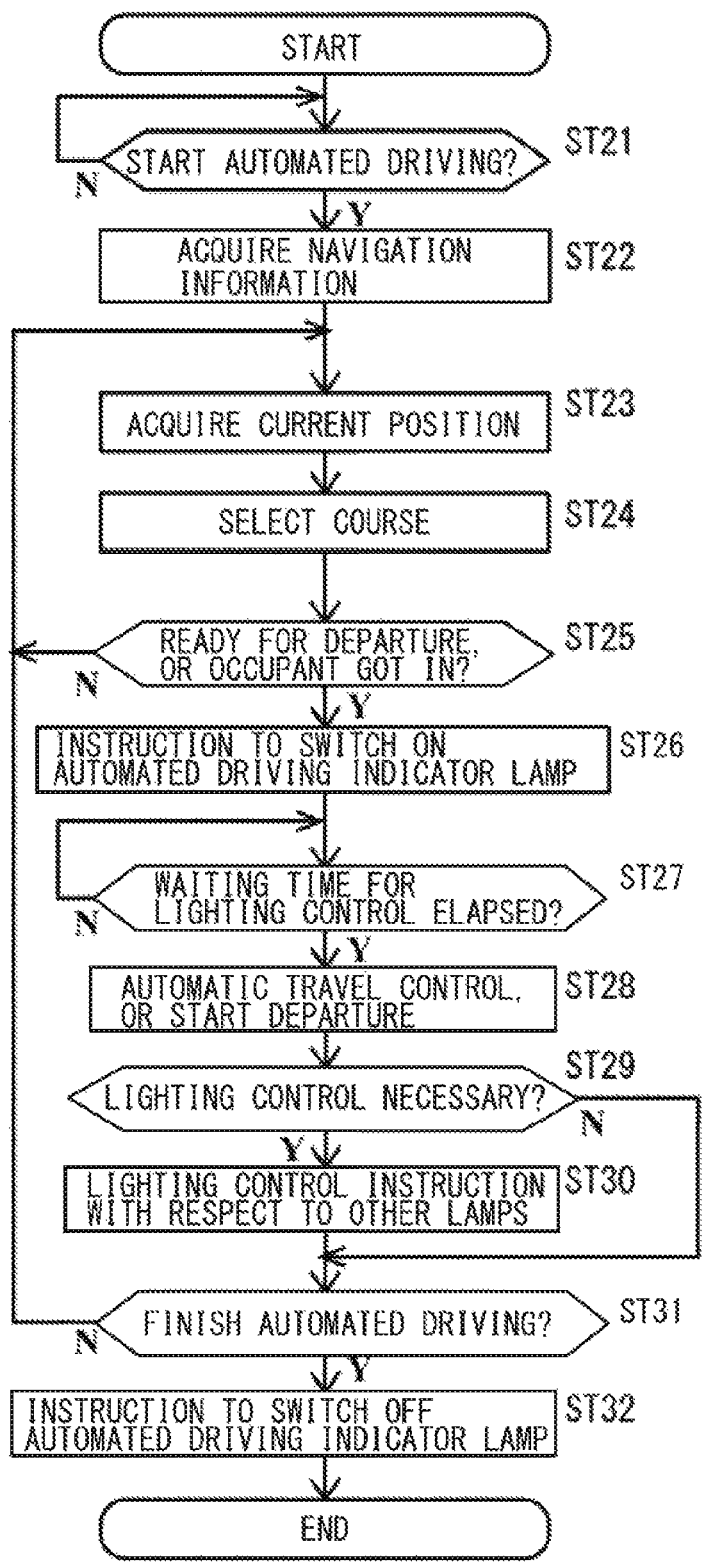
FIG. 4 is a flowchart of a travel control of the automobile by the automated driving.

FIG. 4 is a flowchart of a travel control of the automobile 1 by the automated driving.

The automated driving and driver assistance ECU 14 may repeatedly execute processing of FIG. 4 during the execution of the automated driving, in the case where the automated driving and driver assistance ECU 14 determines in step ST3 or ST10 that the automated driving is going to be started.

In step ST21, the automated driving and driver assistance ECU 14 may determine whether or not to start the automated driving. The automated driving and driver assistance ECU 14 may repeat the process of step ST21 until the automated driving and driver assistance ECU 14 executes the process of step ST3 or ST10 and determines that the automated driving is going to be started. In the case where the automated driving and driver assistance ECU 14 determines that the automated driving is going to be started (Y in step ST21), the automated driving and driver assistance ECU 14 may cause the processing to proceed to step ST22.

In step ST22, the automated driving and driver assistance ECU 14 may acquire navigation information in preparation for a start of the automated driving. The automated driving and driver assistance ECU 14 may acquire, for example, a path of movement to the destination by the automated driving and road information regarding the path of movement from, for example, the UI operation ECU 18 or the external communication ECU 17.

In step ST23, the automated driving and driver assistance ECU 14 may acquire the current position. The automated driving and driver assistance ECU 14 may acquire, from, for example, the detection ECU 16, the current position of the automobile 1 based on latitude and longitude information detected by the GPS receiver 44.

In step ST24, the automated driving and driver assistance ECU 14 may select the course to make a departure from the current position. The "course" as used here refers to, for example, a short-distance path from the current position included in the path of movement. The automated driving and driver assistance ECU 14 may repeat the processing of FIG. 4, and extract, from the path of movement, the short-distance path from the current position, on the basis of the current position updated as the automobile 1 moves. The automated driving and driver assistance ECU 14 may select, as the course, the short-distance path thus extracted. In an automatic driving control, the automated driving and driver assistance ECU 14 may control the travel of the automobile 1 to allow the automobile 1 to travel along the course.

In step ST25, the automated driving and driver assistance ECU 14 may determine whether or not the automobile 1 is ready for the departure. For example, in a case where the automobile 1 is parked or stopped waiting for the occupant 3 to get in, the automated driving and driver assistance ECU 14 may determine that the automobile 1 is ready for the departure, on the basis of detection by the detection ECU 16 of the occupant 3 having got in the automobile 1. For example, in a case where the automobile 1 is stopped waiting for traffic lights to change, the automated driving and driver assistance ECU 14 may determine that the automobile 1 is ready for the departure, on the basis of detection by the detection ECU 16 of a change to the green light. For example, in a case where the automobile 1 is stopped at a stop line, the automated driving and driver assistance ECU 14 may determine that the automobile 1 is ready for the departure, after the detection ECU 16 confirms, on the basis of the image of the external camera 43, absence of, for example, pedestrians waiting to cross the road. In a case where the automated driving and driver assistance ECU 14 does not determine that the automobile 1 is ready for the departure (N in step ST25), the automated driving and driver assistance ECU 14 may cause the processing to return to step ST23. In a case where the automated driving and driver assistance ECU 14 determines that the automobile 1 is ready for the departure (Y in step ST25), the automated driving and driver assistance ECU 14 may cause the processing to proceed to step ST26.

In step ST26, before starting the travel control by the automated driving, the automated driving and driver assistance ECU 14 may output, to the lamp ECU 19 through the vehicle network 26, the lighting control instruction to switch on the automated driving indicator lamp 5.

In one embodiment of the technology, the automated driving and driver assistance ECU 14 may serve as an "instruction output controller".

In step ST27, the automated driving and driver assistance ECU 14 may determine whether or not predetermined waiting time for the lighting control has elapsed after the process of step ST26. In a case where the waiting time for the lighting control has not elapsed (N in step ST27), the automated driving and driver assistance ECU 14 may repeat the process of step ST27. In a case where the waiting time for the lighting control has elapsed (Y in step ST27), the automated driving and driver assistance ECU 14 may cause the processing to proceed to step ST28.

In step ST28, the automated driving and driver assistance ECU 14 may start an automatic travel control. The automated driving and driver assistance ECU 14 may allow the automobile 1 to travel along, for example, the course selected in step ST24. In a case where the automobile 1 has been parked or stopped until just before step ST28, the automobile 1 may start the departure by the automated driving.

In step ST29, the automated driving and driver assistance ECU 14 may determine whether or not the lighting control of any one of the other lamps provided on the automobile 1 is necessary for the automatic travel control.

As described, the automobile 1 may include, for example, the head lamps 51, the turn signal lamps 52, the stop lamps 53, and the back-up lamps 54, as the other lamps than the automated driving indicator lamp 5.

For example, in a case where the automobile 1 is going to turn right or left on the course by the automated driving, or in a case where the automobile 1 is going to travel obliquely frontward to start the departure or to make a lane change, the automated driving and driver assistance ECU 14 may determine that a control to switch on the turn signal lamps 52 is necessary (Y in step ST29), and cause the processing to proceed to step ST30.

For example, in a case where the automobile 1 is going to decelerate during the execution of the automated driving, the automated driving and driver assistance ECU 14 may determine that a control to switch on the stop lamps 53 is necessary (Y in step ST29), and cause the processing to proceed to step ST30.

For example, in a case where it is getting dark around the automobile 1, the automated driving and driver assistance ECU 14 may determine that a control to switch on the head lamps 51 is necessary (Y in step ST29), and cause the processing to proceed to step ST30.

For example, in a case where the automobile 1 is going to make the departure by, for example, moving backward, the automated driving and driver assistance ECU 14 may determine that a control to switch on the back-up lamps 54 is necessary (Y in step ST29), and cause the processing to proceed to step ST30.

For example, in a case where the automobile 1 is going to start straight travel along a road, the automated driving and driver assistance ECU 14 may determine that a control to switch off the turn signal lamps 52 or the back-up lamps 54, or both is necessary (Y in step ST29), and cause the processing to proceed to step ST30.

For example, in a case where the automobile is going to start moving forward along the road after moving backward, the automated driving and driver assistance ECU 14 may determine that a control to switch off the back-up lamps 54 is necessary (Y in step ST29), and cause the processing to proceed to step ST30.

In a case otherwise than given above (N in step ST29), the automated driving and driver assistance ECU 14 may cause the processing to proceed to step ST31.

It is to be noted that the automated driving and driver assistance ECU 14 may make the determinations as given above, by the automated driving control itself the automated driving and driver assistance ECU 14 makes on its own. Alternatively, the automated driving and driver assistance ECU 14 may make the determinations as given above, on the basis of inputs of the detection by the detection ECU 16 and/or inputs of the operation on the driving operation ECU 15, during the execution of the automated driving enough for the automated driving and driver assistance ECU 14 to accept the inputs.

In step ST30, the automated driving and driver assistance ECU 14 may output, to the lamp ECU 19 through the vehicle network 26, the lighting control instruction with respect to each of the other lamps than the automated driving indicator lamp 5. The lighting control instruction may include information regarding which one of the other lamps to control, and information regarding whether to switch on the relevant lamp or whether to switch off the relevant lamp.

In this way, the automated driving and driver assistance ECU 14 may output, to the lamp ECU 19, the lighting control instruction with respect to each of the other lamps, e.g., the turn signal lamps 52, separately from the lighting control instruction to switch on the automated driving indicator lamp 5.

In one embodiment of the technology, the automated driving and driver assistance ECU 14 may serve as the "instruction output controller".

In step ST31, the automated driving and driver assistance ECU 14 may determine whether or not to finish the automated driving. For example, in a case where the automobile 1 arrives at the destination and is parked or stopped, the automated driving and driver assistance ECU 14 may determine that the automated driving is going to be finished (Y in step ST31), and cause the processing to proceed to step ST32. In a case where the automated driving and driver assistance ECU 14 does not determine that the automated driving is going to be finished (N in step ST31), the automated driving and driver assistance ECU 14 may cause the processing to return to step ST23. For example, the automated driving and driver assistance ECU 14 may repeat the processes of steps ST23 to ST31 until the automobile 1 arrives at the destination and is parked or stopped.

In step ST32, the automated driving and driver assistance ECU 14 may output, to the lamp ECU 19 through the vehicle network 26, the lighting control instruction to switch off the automated driving indicator lamp 5. Thereafter, the automated driving and driver assistance ECU 14 may terminate the processing of FIG. 4.

Figure 5:
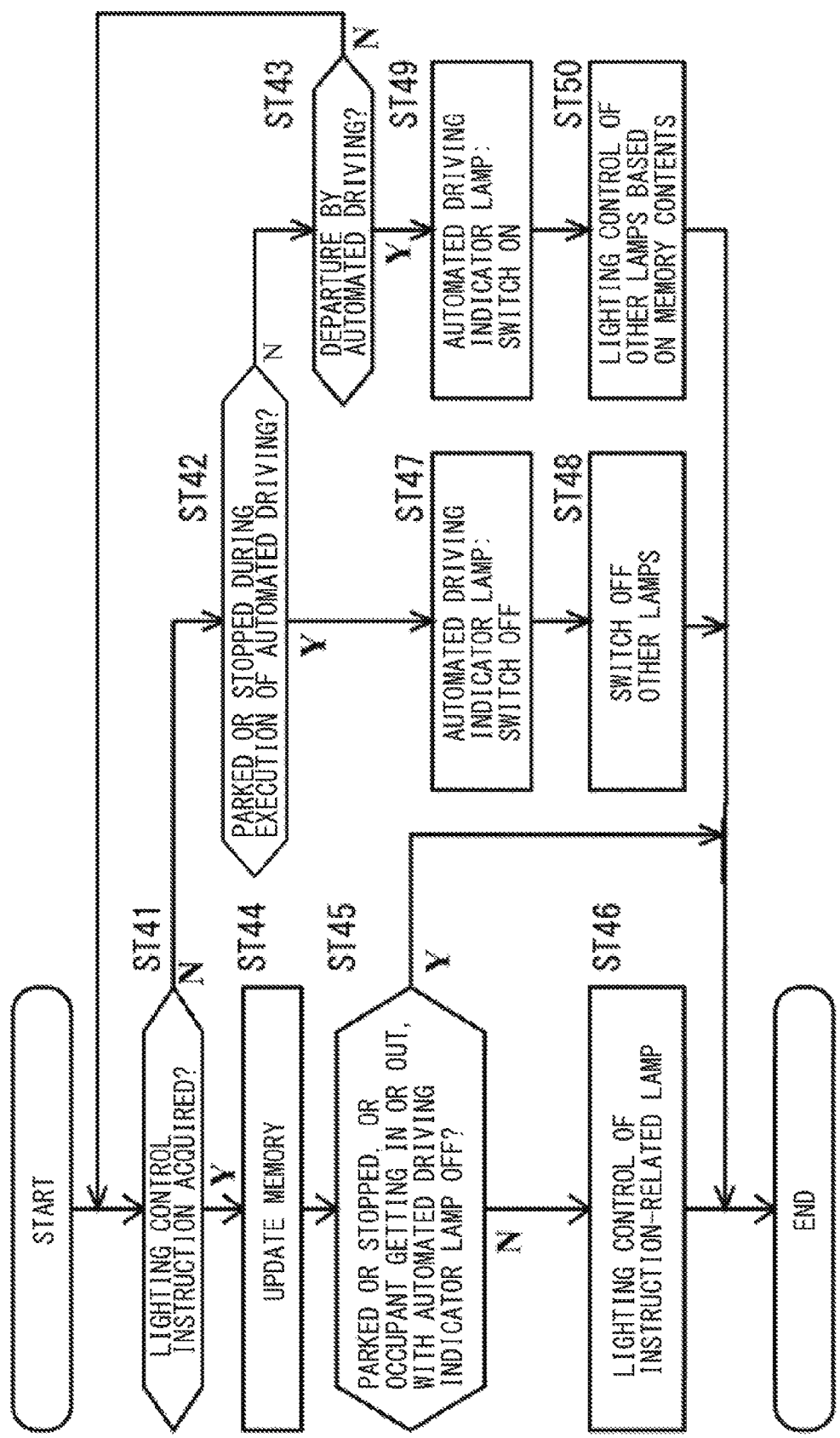
FIG. 5 is a flowchart of a lighting control of an automated driving indicator lamp and other lamps.

FIG. 5 is a flowchart of the lighting control of the automated driving indicator lamp 5 and the other lamps.

The lamp ECU 19 may repeatedly execute processing of FIG. 5, in a case where the automobile 1 has been started up, regardless of whether or not the automobile 1 is traveling.

In step ST41, the lamp ECU 19 may determine whether or not the lamp ECU 19 has newly acquired the lighting control instruction for lamp lighting. For example, in a case where the lamp ECU 19 has newly acquired the lighting control instruction for a lamp lighting control from the automated driving and driver assistance ECU 14, the lamp ECU 19 may determine that the lamp ECU 19 has newly acquired the lighting control instruction (Y in step ST41), and cause the processing to proceed to step ST44. In a case where the lamp ECU 19 has not newly acquired the lighting control instruction (N in step ST41), the lamp ECU 19 may cause the processing to proceed to step ST42.

In step ST42, the lamp ECU 19 may determine whether or not the automobile 1 is parked or stopped during the execution of the automated driving. For example, in a case where the automated driving and driver assistance ECU 14 makes the automobile 1 parked or stopped by the automated driving, the lamp ECU 19 may determine that the automobile 1 is parked or stopped during the execution of the automated driving (Y in step ST42), and cause the processing to proceed to step ST47. In a case where the automated driving is not in execution, or in a case where the automobile 1 is not parked or stopped but traveling (N in step ST42), the lamp ECU 19 may cause the processing to proceed to step ST43.

In step ST43, the lamp ECU 19 may determine whether or not the automobile 1 has started a new departure by the automated driving. For example, in a case where the automated driving and driver assistance ECU 14 has allowed the automobile 1 parked or stopped to start new travel, the lamp ECU 19 may determine that the automobile 1 has made the new departure by the automated driving (Y in step ST43), and cause the processing to proceed to step ST49. In a case where the lamp ECU 19 does not determine that the automobile 1 has made the new departure by the automated driving (N in step ST43), the lamp ECU 19 may cause the processing to return to step ST41. In this case, the lamp ECU 19 may repeat the determination processes of steps ST41 to ST43.

Back in step ST41, in a case where the lamp ECU 19 has newly acquired the lighting control instruction with respect to the lamp lighting (Y in step ST41), the lamp ECU 19 may execute step ST44. In step ST44, the lamp ECU 19 may update the lighting instruction management table 70 held by the memory 59, with the newly acquired lighting control instruction. In the lighting instruction management table 70, information regarding the current state of the lighting control instruction with respect to whichever lamp is related to the relevant lighting control instruction is overwritten by the newly acquired lighting control instruction. For example, assume a case where the lamp ECU 19 has newly acquired the lighting control instruction to switch on the turn signal lamps 52. In this case, in the lighting instruction management table 70, the current state of the lighting control instruction to switch off the turn signal lamps 52 is overwritten by the newly acquired lighting control instruction to switch on the turn signal lamps 52.

In step ST45, the lamp ECU 19 may determine whether or not the automobile 1 is parked or stopped with the automated driving indicator lamp 5 off. For example, in a case where the automated driving and driver assistance ECU 14 makes the automobile 1 parked or stopped by the automated driving, for example, waiting for the occupant to get in or out, causing the lamp ECU 19 to switch off the automated driving indicator lamp 5 in step ST47 described later, the lamp ECU 19 may determine that the automobile 1 is parked or stopped with the automated driving indicator lamp 5 off (Y in step ST45), and terminate the processing of FIG. 5. In a case otherwise than described (N in step ST45), the lamp ECU 19 may cause the processing to proceed to step ST46.

In step ST46, the lamp ECU 19 may execute the lighting control of whichever lamp is related to the relevant lighting control instruction. The lamp ECU 19 may switch on or switch off whichever lamp is related to the relevant lighting control instruction, on the basis of the newly acquired lighting control instruction. Thus, the lighting state of whichever lamp is related to the relevant lighting control instruction is switched from the previous lighting state.

As described, the lamp ECU 19 may acquire, from the automated driving and driver assistance ECU 14, the lighting control instruction to switch on the automated driving indicator lamp 5, and allow the memory 59 to hold the current state of the lighting control instruction to switch on the automated driving indicator lamp 5. In this case, in response to acquisition of the lighting control instruction from the automated driving and driver assistance ECU 14, the lamp ECU 19 may make a switching control of the lighting states of the other lamps, e.g., the turn signal lamps 52, on the basis of the lighting control instruction acquired.

Meanwhile, in the case where the automobile 1 is parked or stopped with the automated driving indicator lamp 5 off (Y in step ST45), the lamp ECU 19 may terminate the processing of FIG. 5, as described, without executing the process of step ST46. In this case, the current state of the lighting control instruction with respect to the automated driving indicator lamp 5 held by the memory 59 is to switch off. The lamp ECU 19 may update the memory 59 with the current state of the lighting control instruction to switch on any one of the other lamps, e.g., the turn signal lamps 52, in response to acquisition of the relevant lighting control instruction from the automated driving and driver assistance ECU 14, without switching on whichever lamp of the other lamps is related to the relevant lighting control instruction, e.g., the turn signal lamps 52.

Back in step ST42, in a case where the automobile 1 is parked or stopped during the execution of the automated driving (Y in step ST42), the lamp ECU 19 may execute step ST47. In step ST47, the lamp ECU 19 may switch off the automated driving indicator lamp 5 of the automobile 1 parked or stopped.

In step ST48, the lamp ECU 19 may further switch off the other lamps than the automated driving indicator lamp 5, e.g., the head lamps 51, the turn signal lamps 52, the stop lamps 53, and the back-up lamps 54. Thus, in the case where the automobile 1 is parked or stopped during the execution of the automated driving, the lamp ECU 19 may switch off all the lamps provided on the automobile 1, whatever current states of the lighting control instructions are held by the lighting instruction management table 70 of the memory 59.

Back in step ST43, in the case where the automobile 1 has started the new departure by the automated driving (Y in step ST43), the lamp ECU 19 may execute step ST49. In step ST49, the lamp ECU 19 may switch on the automated driving indicator lamp 5 of the automobile 1 starting the new departure from the parked or stopped state.

In step ST50, the lamp ECU 19 may make the lighting control of the other lamps than the automated driving indicator lamp 5, e.g., the head lamps 51, the turn signal lamps 52, the stop lamps 53, and the back-up lamps 54, on the basis of the current states of the lighting control instructions held by the memory 59. The lamp ECU 19 may make the lighting control of the other lamps than the automated driving indicator lamp 5, e.g., the head lamps 51, the turn signal lamps 52, the stop lamps 53, and the back-up lamps 54, on the basis of the records of the current states of the lighting control instructions included in the lighting instruction management table 70 of the memory 59. The lamp ECU 19 may switch on the automated driving indicator lamp 5, and afterwards, switch on whichever lamp of the other lamps is related to the lighting control instruction already acquired, on the basis of the current states of the lighting control instructions held by the memory 59.

As described, in the case where the automobile 1 is about to make the departure by the automated driving from the parked or stopped state with the lamps of the automobile 1 inclusive of the automated driving indicator lamp 5 off, the lamp ECU 19 may, first, switch on the automated driving indicator lamp 5 that has been off, and afterwards, switch on the other lamps that have been off, e.g., the head lamps 51, the turn signal lamps 52, the stop lamps 53, or the back-up lamps 54, or any combination thereof, on the basis of the current states of the lighting control instructions held by the memory 59. The lamp ECU 19 may start to switch on the automated driving indicator lamp 5 that has been off, before starting to switch on the other lamps, e.g., the turn signal lamps 52.

Moreover, before the automobile 1 makes the departure from the parked or stopped state, the automated driving and driver assistance ECU 14 may output the lighting control instruction to switch on the automated driving indicator lamp 5 in step ST26. In this case as well, the lamp ECU 19 may, first, switch on the automated driving indicator lamp 5 that has been off, and afterwards, switch on the other lamps that have been off, e.g., the head lamps 51, the turn signal lamps 52, the stop lamps 53, or the back-up lamps 54, or any combination thereof.

Furthermore, as mentioned above, in the process of step ST27 after step ST26, the automated driving and driver assistance ECU 14 may wait for the elapse of the predetermined waiting time for the lighting control. Thereafter, in step ST28, the automated driving and driver assistance ECU 14 may start the automatic travel control. After both the automated driving indicator lamp 5 and the other lamps, e.g., the head lamps 51, the turn signal lamps 52, the stop lamps 53, and the back-up lamps 54, have started to be on, the automobile 1 is able to make the departure by the automated driving.

Figure 6:
FIG. 6 is a diagram of an example of a lighting instruction management table to be held by a memory.
Figure 6:
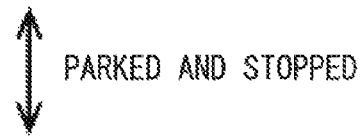

FIG. 6 illustrates an example of the lighting instruction management table 70 to be held by the memory 59.

As illustrated in part (A) of FIG. 6, the lighting instruction management table 70 may include records for each of the lamps of the automobile 1. In this example, the lighting instruction management table 70 may include a record of the automated driving indicator lamp 5, a record of the back-up lamps 54, and a record of the turn signal lamps 52.

The record for each of the lamps may include information regarding a lamp name and information regarding the current state of the lighting control instruction. For example, the record of the turn signal lamps 52 may include the information regarding the lamp name "turn signal lamps" and the information regarding the current state "switch off".

In a case where the lamp ECU 19 acquires the lighting control instruction to switch on the back-up lamps 54, with the lighting instruction management table 70 in part (A) of FIG. 6 held by the memory 59, the lamp ECU 19 may update, in step ST44, the record of the back-up lamps 54 of the lighting instruction management table 70. The information regarding the current state of the lighting control instruction with respect to the back-up lamps 54 being "switch off" as in part (A) of FIG. 6 may updated with "switch on" as in part (B) of FIG. 6.

In a case where the automobile 1 executing the automated driving is parked or stopped, with the lighting instruction management table 70 in part (B) of FIG. 6 held by the memory 59, the lamp ECU 19 may switch off the automated driving indicator lamp 5 by the process of step ST47. Thereafter, the lamp ECU 19 may switch off the other lamps, e.g., the head lamps 51, the turn signal lamps 52, the stop lamps 53, and the back-up lamps 54 by the process of step ST48.

Thereafter, in a case where the automobile 1 parked or stopped starts the departure by the automated driving, the lamp ECU 19 may switch on, by the process of step ST49, the automated driving indicator lamp 5 that has been off while the automobile 1 is parked or stopped. The lamp ECU 19 may execute the lighting control of the other lamps, e.g., the head lamps 51, the turn signal lamps 52, the stop lamps 53, and the back-up lamps 54, by the process of, for example, step ST50, on the basis of the lighting instruction management table 70. The lamp ECU 19 may switch on whichever lamp corresponds to the record of the current state of the lighting control instruction being "switch on". The lamp ECU 19 may keep off whichever lamp corresponds to the record of the current state of the lighting control instruction being "switch off". In the case with the lighting instruction management table 70 as in FIG. 6, the lamp ECU 19 may control the lighting states of the turn signal lamps 52 and the back-up lamps 54.

In one embodiment of the technology, the turn signal lamps 52 may each serve as the "direction indicator" of the automobile 1. In one embodiment of the technology, the back-up lamps 54 may each serve as the "reverse lamp" of the automobile 1.

As described, in this embodiment, in the case where the automobile 1 is about to make the departure by the automated driving from the parked or stopped state with the automated driving indicator lamp 5 and the other lamps off, the lamp ECU 19 is configured to start to switch on the automated driving indicator lamp 5 that has been off, before starting to switch on the other lamps, e.g., the turn signal lamps 52. The other lamps may serve as the "direction indicator" or the "reverse lamp", or both, of the automobile 1.

Thus, with the automobile 1 in the parked or stopped state, the automated driving indicator lamp 5 is the first to be switched on. This makes it possible for those around the automobile 1, e.g., pedestrians and occupants of the surrounding automobile 2, to properly recognize that the automobile 1 is about to make the departure by the automated driving, with the clue of the illumination of the automated driving indicator lamp 5, i.e., the first to be switched on of the lamps provided on the automobile 1 in the parked or stopped state. The color of the illumination of the automated driving indicator lamp 5 is unlikely to become less perceptible, unlike the case where the other lamps of the automobile 1, e.g., the turn signal lamps 52, start to be on at the same time as the automated driving indicator lamp 5. It is, therefore, possible to properly recognize that the automobile 1 is about to make the departure by the automated driving. For example, even if the occupant of the automobile 1 making the departure is looking away from the surroundings in the direction of the departure, or even if the automobile 1 makes the departure without any occupants, it is possible for those around the automobile 1, e.g., pedestrians and occupants of the surrounding automobile 2, to properly recognize that the automobile 1 is about to make the departure by the automated driving. It is possible to call for attention of those around the automobile 1, by the illumination of the automated driving indicator lamp 5.

In particular, in the case where the automobile 1 is about to make the departure by the automated driving from the parked or stopped state with the automated driving indicator lamp 5 and the other lamps off, the lamp ECU 19 is configured to, first, switch on the automated driving indicator lamp 5 that has been off, and afterwards, switch on the other lamps that have been off, e.g., the turn signal lamps 52. Thereafter, the automobile 1 is configured to start the departure by the automated driving.

Hence, it is possible for the automobile 1 to start the departure by the automated driving, with those around the automobile 1 having the proper recognition that the automobile 1 is about to make the departure by the automated driving.

In this embodiment, the automobile 1 may further include the automated driving and driver assistance ECU 14 and the memory 59. The automated driving and driver assistance ECU 14 is configured to output the lighting control instruction with respect to the automated driving indicator lamp 5 and the lighting control instruction with respect to each of the other lamps. The memory 59 is provided in the automobile 1 and configured to hold the current state of the lighting control instruction with respect to the automated driving indicator lamp 5 and the current state of the lighting control instruction with respect to each of the other lamps. The lamp ECU 19 is configured to update the memory 59 with the current state of the lighting control instruction with respect to the automated driving indicator lamp 5 or the current state of the lighting control instruction with respect to any one of the other lamps, e.g., the turn signal lamps 52, in response to acquisition of the relevant lighting control instruction from the automated driving and driver assistance ECU 14.

Hence, it is possible for the lamp ECU 19 to grasp which one of the other lamps to switch on currently on the basis of the current state of the lighting control instruction held by the memory 59, and to make the lighting control of the relevant one of the other lamps, e.g., the turn signal lamps 52. This saves the automated driving and driver assistance ECU 14 executing a process of outputting again the lighting control instructions with respect to the relevant one of the other lamps, e.g., the turn signal lamps 52, after the lamp ECU 19 switches on the automated driving indicator lamp 5.

For example, in the case where the automobile 1 is in the parked or stopped state during the execution of the automated driving, and the current state of the lighting control instruction with respect to the automated driving indictor lamp 5 held by the memory 59 is to switch off, the lamp ECU 19 is configured to update the memory 59 with the current state of the lighting control instruction to switch on any one of the other lamps, e.g., the turn signal lamps 52, in response to acquisition of the lighting control instruction to switch on the relevant one of the other lamps, e.g., the turn signal lamps 52, from the automated driving and driver assistance ECU 14, without switching on whichever lamp of the other lamps is related to the relevant lighting control instruction, e.g., the turn signal lamps 52.

After updating the memory 59, the lamp ECU 19 is configured to acquire the lighting control instruction to switch on the automated driving indicator lamp 5 from the automated driving and driver assistance ECU 14, and switch on the automated driving indicator lamp 5. Afterwards, the lamp ECU 19 is configured to switch on whichever lamp of the other lamps, e.g., the turn signal lamps 52, is related to the relevant control instruction already acquired, on the basis of the current state of the lighting control instruction with which the memory 59 has been updated. At this occasion, it is unnecessary for the automated driving and driver assistance ECU 14 to output again the lighting control instructions with respect to the relevant one of the other lamps, e.g., the turn signal lamps 52.

Furthermore, in the case where the current state of the lighting control instruction with respect to the automated driving indicator lamp 5 held by the memory 59 is to switch on, the lamp ECU 19 is configured to switch on any one of the other lamps, e.g., the turn signal lamps 52, in response to acquisition of the lighting control instruction to switch on the relevant one of the other lamps, e.g., the turn signal lamps 52, from the automated driving and driver assistance ECU 14.

Hence, it is possible to switch on the relevant one of the other lamps, e.g., the turn signal lamps 52, immediately on the basis of the lighting control instruction.

In addition, for example, in the case where the automobile 1 is parked or stopped during the execution of the automated driving, the lamp ECU 19 is configured to switch off the automated driving indicator lamp 5 and the other lamps, regardless of whatever current states of the lighting control instructions are held by the memory 59. Even in this case, when the automobile 1 is about to make the departure by the automated driving from the parked or stopped state, the lamp ECU 19 is configured to switch on the automated driving indicator lamp 5 and the other lamps that have been off, e.g., the turn signal lamps 52, on the basis of the current states of the lighting control instructions held by the memory 59. At this occasion, the lamp ECU 19 is configured to, first, switch on the automated driving indicator lamp 5 that has been off, and afterwards, switch on the other lamps that have been off, e.g., the turn signal lamps 52.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

The automated driving and driver assistance ECU 14 and the lamp ECU 19 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the automated driving and driver assistance ECU 14 and the lamp ECU 19. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the automated driving and driver assistance ECU 14 and the lamp ECU 19 illustrated in FIG. 2.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An automated driving enabled vehicle, comprising:
an automated driving indicator lamp configured to be switched on perceptibly from outside the vehicle on an occasion of automated driving of the vehicle;
one or more lamps provided on the vehicle separately from the automated driving indicator lamp; and
a lamp controller configured to control a lighting state of the automated driving indicator lamp and lighting states of the one or more lamps,
the lamp controller being configured to start to switch on the automated driving indicator lamp that has been off, before starting to switch on the one or more lamps, on a condition that the vehicle is about to make a departure by the automated driving from a parked or stopped state with the automated driving indicator lamp and the one or more lamps off.

2. The automated driving enabled vehicle according to claim 1, wherein
on the condition that the vehicle is about to make the departure by the automated driving from the parked or stopped state with the automated driving indicator lamp and the one or more lamps off, the lamp controller is configured to switch on the automated driving indicator lamp that has been off, and afterwards, switch on the one or more lamps that have been off, and the vehicle is configured to make the departure by the automated driving, after both the automated driving indicator lamp and the one or more lamps have started to be on.

3. The automated driving enabled vehicle according to claim 1, further comprising:
an instruction output controller configured to output a lighting control instruction with respect to the automated driving indicator lamp and a lighting control instruction with respect to each of the one or more lamps; and
a memory provided in the vehicle and configured to hold a current state of the lighting control instruction with respect to the automated driving indicator lamp and a current state of the lighting control instruction with respect to each of the one or more lamps, wherein
the lamp controller is configured to update the memory with the current state of the lighting control instruction with respect to the automated driving indicator lamp or the current state of the lighting control instruction with respect to any one of the one or more lamps, in response to acquisition of the relevant lighting control instruction from the instruction output controller.

4. The automated driving enabled vehicle according to claim 2, further comprising:
an instruction output controller configured to output a lighting control instruction with respect to the automated driving indicator lamp and a lighting control instruction with respect to each of the one or more lamps; and
a memory provided in the vehicle and configured to hold a current state of the lighting control instruction with respect to the automated driving indicator lamp and a current state of the lighting control instruction with respect to each of the one or more lamps, wherein
the lamp controller is configured to update the memory with the current state of the lighting control instruction with respect to the automated driving indicator lamp or the current state of the lighting control instruction with respect to any one of the one or more lamps, in response to acquisition of the relevant lighting control instruction from the instruction output controller.

5. The automated driving enabled vehicle according to claim 3, wherein
on a condition that the vehicle is in the parked or stopped state during execution of the automated driving, and that the current state of the lighting control instruction with respect to the automated driving indicator lamp held by the memory is to switch off, the lamp controller is configured to update the memory with the current state of the lighting control instruction to switch on any one of the one or more lamps, in response to acquisition of the relevant lighting control instruction from the instruction output controller, without switching on whichever lamp of the one or more lamps is related to the relevant lighting control instruction, and
after updating the memory, the lamp controller is configured to acquire the lighting control instruction to switch on the automated driving indicator lamp from the instruction output controller, switch on the automated driving indicator lamp, and afterwards, switch on whichever lamp of the one or more lamps is related to the relevant lighting control instruction already acquired, on a basis of the current state of the lighting control instruction with which the memory has been updated.

6. The automated driving enabled vehicle according to claim 4, wherein
on a condition that the vehicle is in the parked or stopped state during execution of the automated driving, and that the current state of the lighting control instruction with respect to the automated driving indicator lamp held by the memory is to switch off, the lamp controller is configured to update the memory with the current state of the lighting control instruction to switch on any one of the one or more lamps, in response to acquisition of the relevant lighting control instruction from the instruction output controller, without switching on whichever lamp of the one or more lamps is related to the relevant lighting control instruction, and
after updating the memory, the lamp controller is configured to acquire the lighting control instruction to switch on the automated driving indicator lamp from the instruction output controller, switch on the automated driving indicator lamp, and afterwards, switch on whichever lamp of the one or more lamps is related to the relevant lighting control instruction already acquired, on a basis of the current state of the lighting control instruction with which the memory has been updated.

7. The automated driving enabled vehicle according to claim 3, wherein
on a condition that the current state of the lighting control instruction with respect to the automated driving indicator lamp held by the memory is to switch on, the lamp controller is configured to switch on any one of the one or more lamps, in response to acquisition of the lighting control instruction to switch on the relevant one of the one or more lamps from the instruction output controller.

8. The automated driving enabled vehicle according to claim 4, wherein
on a condition that the current state of the lighting control instruction with respect to the automated driving indicator lamp held by the memory is to switch on, the lamp controller is configured to switch on any one of the one or more lamps, in response to acquisition of the lighting control instruction to switch on the relevant one of the one or more lamps from the instruction output controller.

9. The automated driving enabled vehicle according to claim 5, wherein
on a condition that the current state of the lighting control instruction with respect to the automated driving indicator lamp held by the memory is to switch on, the lamp controller is configured to switch on any one of the one or more lamps, in response to acquisition of the lighting control instruction to switch on the relevant one of the one or more lamps from the instruction output controller.

10. The automated driving enabled vehicle according to claim 6, wherein
on a condition that the current state of the lighting control instruction with respect to the automated driving indicator lamp held by the memory is to switch on, the lamp controller is configured to switch on any one of the one or more lamps, in response to acquisition of the lighting control instruction to switch on the relevant one of the one or more lamps from the instruction output controller.

11. The automated driving enabled vehicle according to claim 3, wherein
on a condition that the vehicle is parked or stopped during the execution of the automated driving, the lamp controller is configured to switch off the automated driving indicator lamp and the one or more lamps, regardless of whatever current states of the lighting control instructions are held by the memory, and
on a condition that the vehicle is about to make the departure by the automated driving from the parked or stopped state, the lamp controller is configured to switch on the automated driving indicator lamp that has been off, and afterwards, switch on the one or more lamps that have been off, on the basis of the current states of the lighting control instructions held by the memory.

12. The automated driving enabled vehicle according to claim 4, wherein
on a condition that the vehicle is parked or stopped during the execution of the automated driving, the lamp controller is configured to switch off the automated driving indicator lamp and the one or more lamps, regardless of whatever current states of the lighting control instructions are held by the memory, and
on a condition that the vehicle is about to make the departure by the automated driving from the parked or stopped state, the lamp controller is configured to switch on the automated driving indicator lamp that has been off, and afterwards, switch on the one or more lamps that have been off, on the basis of the current states of the lighting control instructions held by the memory.

13. The automated driving enabled vehicle according to claim 5, wherein
on a condition that the vehicle is parked or stopped during the execution of the automated driving, the lamp controller is configured to switch off the automated driving indicator lamp and the one or more lamps, regardless of whatever current states of the lighting control instructions are held by the memory, and
on a condition that the vehicle is about to make the departure by the automated driving from the parked or stopped state, the lamp controller is configured to switch on the automated driving indicator lamp that has been off, and afterwards, switch on the one or more lamps that have been off, on the basis of the current states of the lighting control instructions held by the memory.

14. The automated driving enabled vehicle according to claim 6, wherein
on a condition that the vehicle is parked or stopped during the execution of the automated driving, the lamp controller is configured to switch off the automated driving indicator lamp and the one or more lamps, regardless of whatever current states of the lighting control instructions are held by the memory, and
on a condition that the vehicle is about to make the departure by the automated driving from the parked or stopped state, the lamp controller is configured to switch on the automated driving indicator lamp that has been off, and afterwards, switch on the one or more lamps that have been off, on the basis of the current states of the lighting control instructions held by the memory.

15. The automated driving enabled vehicle according to claim 1, wherein
the one or more lamps comprise a direction indicator or a reverse lamp, or both, of the vehicle.

16. The automated driving enabled vehicle according to claim 2, wherein
the one or more lamps comprise a direction indicator or a reverse lamp, or both, of the vehicle.

17. The automated driving enabled vehicle according to claim 3, wherein
the one or more lamps comprise a direction indicator or a reverse lamp, or both, of the vehicle.

18. The automated driving enabled vehicle according to claim 4, wherein
the one or more lamps comprise a direction indicator or a reverse lamp, or both, of the vehicle.

19. The automated driving enabled vehicle according to claim 5, wherein
the one or more lamps comprise a direction indicator or a reverse lamp, or both, of the vehicle.

20. The automated driving enabled vehicle according to claim 6, wherein
the one or more lamps comprise a direction indicator or a reverse lamp, or both, of the vehicle.

* * * * *